March 18, 1952     W. P. GRAETZ     2,589,690
AUTOMATIC POULTRY FEEDER
Filed March 20, 1951                            2 SHEETS—SHEET 1
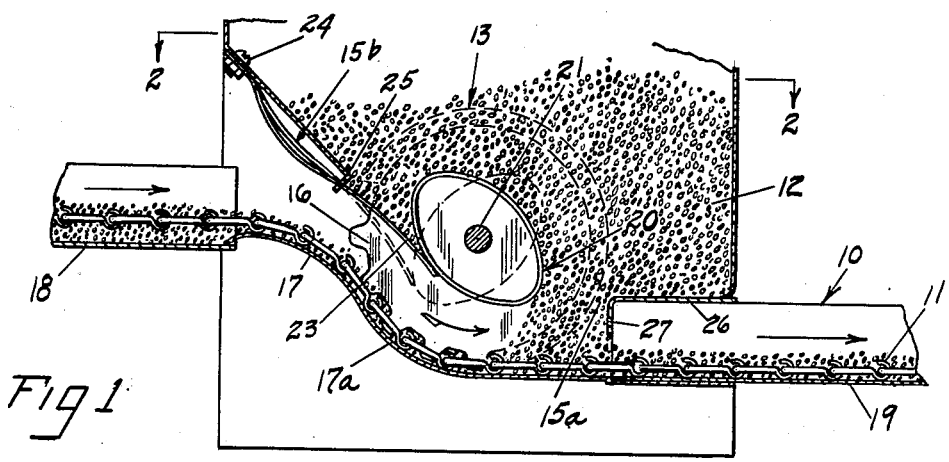
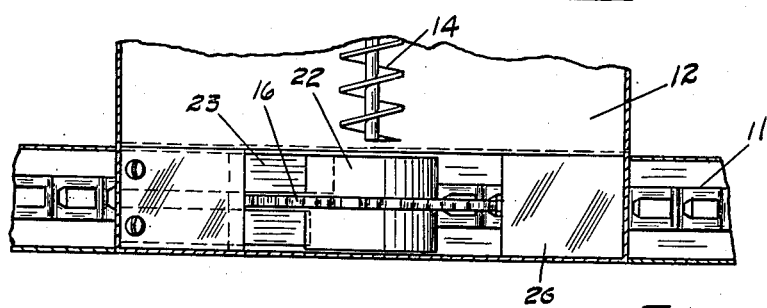
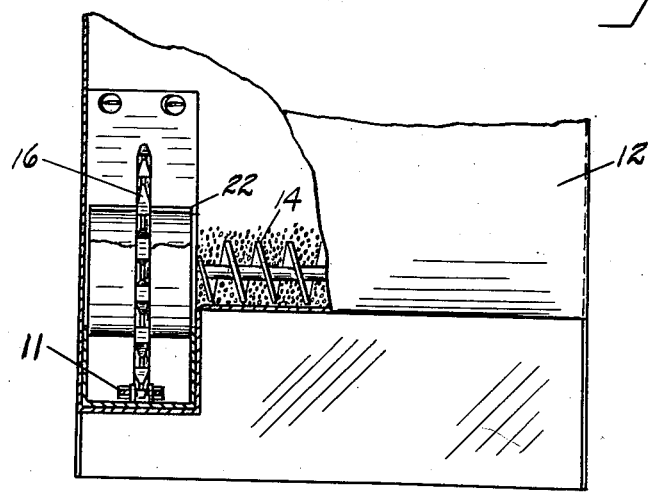
INVENTOR.
WILLIAM P. GRAETZ
BY
Corbett, Mahoney + Miller
ATTYS.

March 18, 1952 W. P. GRAETZ 2,589,690
AUTOMATIC POULTRY FEEDER
Filed March 20, 1951 2 SHEETS—SHEET 2
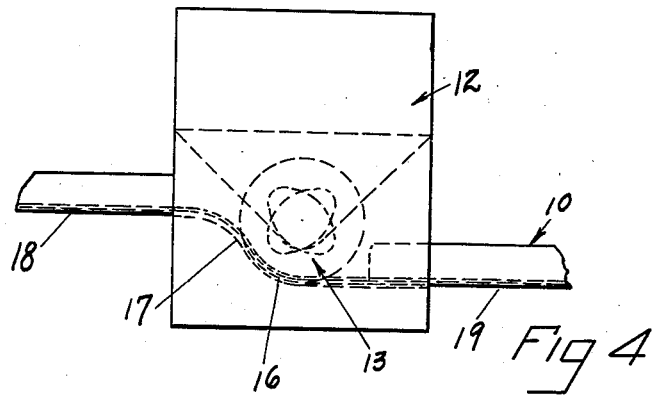
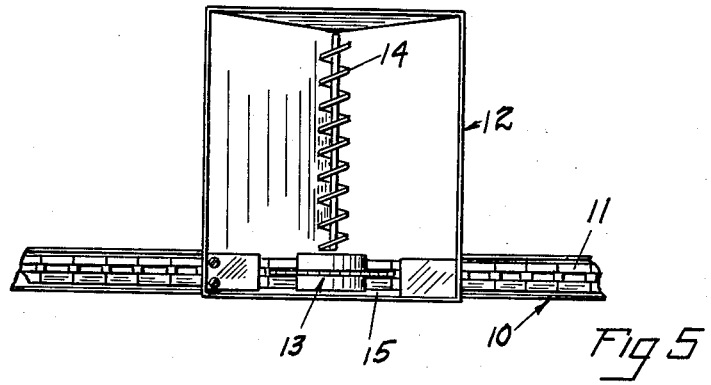
INVENTOR.
WILLIAM P. GRAETZ
BY
ATTYS.

Patented Mar. 18, 1952

2,589,690

UNITED STATES PATENT OFFICE 2,589,690

AUTOMATIC POULTRY FEEDER

William P. Graetz, Bremen, Ohio, assignor to McAuley Manufacturing, Inc., Bremen, Ohio, a corporation of Ohio Application March 20, 1951, Serial No. 216,563

5 Claims. (Cl. 198—53)

My invention relates to an automatic poultry feeder. It has to do, more particularly, with means for supplying sufficient feed but for preventing the accumulation of an excessive amount of feed in the feeder.

At the present time, poultry feeders of the automatic type are in use and one type consists of an elongated endless feed trough having an endless distributing chain for carrying the feed through the trough. The trough is so disposed that the poultry can have access to the trough throughout the greater portion of its length. Usually, at a suitable location along the trough, a hopper is provided for feeding the feed by gravity to the constantly moving chain. With prior art arrangements, the feed is not properly supplied from the hopper onto the chain moving through the trough and, consequently, it is not uniformly distributed along the chain. Sometimes, for various reasons, the feed is not eaten by the poultry and, therefore, an excess accumulates on the chain in the trough and causes jamming of feed in the trough especially at the point where the chain returns beneath the hopper outlet.

It is the main object of my invention to provide a constant level device in association with the distributing chain of an automatic poultry feeder of the type indicated above, which will function to supply a sufficient amount of the feed to the chain as it moves therebeneath but will prevent the feed from accumulating in an excessive amount on the chain in the trough which would tend to jam in the trough.

Another object of my invention is to provide a device of the type indicated in the preceding paragraph which is extremely simple and inexpensive yet very effective for the purposes for which it is designed.

Various other objects will be apparent.

According to my invention, at the outlet or mouth of the hopper, which supplies the feed to the trough with the endless chain moving therethrough, I provide my constant level device. This device includes a wheel or pump which rotates in the hopper outlet. If the feed in the trough is not being consumed at a sufficient rate by the poultry, the wheel or pump will serve to force the surplus back up into the hopper. Just beyond the hopper outlet I provide a leveling or strike-off blade which levels the feed on the chain to a preselected level, the excess feed which is struck off by the blade being forced upwardly into the mouth or outlet of the hopper by the wheel or pump. Thus, in ordinary usage of the feeder, the feed is allowed to drop by gravity onto the chain. However, if the feed starts to accumulate excessively on the return portion of the chain as it moves beneath the hopper, due to a decrease in consumption by the poultry, the excess is forced back up into the hopper by the pump.

The preferred embodiment of my invention is illustrated in the accompanying drawings wherein similar characters of reference designate corresponding parts and wherein:

Figure 1 is a vertical sectional view through the constant level device of our invention.

Figure 2 is a horizontal sectional view taken on line 2—2 of Figure 1.

Figure 3 is a front view, partly broken away, showing where our device is located relative to the hopper.

Figure 4 is a side elevational view illustrating how our device may be associated with the hopper of an automatic poultry feeder.

Figure 5 is a plan view of the structure of Figure 4.

As indicated before, my constant level device may be applied to an automatic poultry feeder. One type of poultry feeder is illustrated partially in Figures 4 and 5. This type of feeder consists of an elongated endless feed trough 10 having an endless distributing chain 11 passing therethrough. At a suitable location along the trough, the feed hopper 12 is provided. My constant level device is indicated generally at 13 and is associated with one end of the hopper 12 above the chain 11. The hopper 12 may have a feed screw 14 at the bottom thereof which can be suitably driven by means not shown in the drawings. The screw 14 serves to feed the poultry feed to an outlet 15, provided at one side of the hopper where our device 13 is disposed, and through which the feed may drop.

The chain 11 is driven and supported by means including a sprocket 16. As shown in Figures 1 and 4, this sprocket 16 is located along the trough where an inclined section 17 connects the sections 18 and 19 which are at different levels. In fact, as shown in Figure 1, a portion 17a of the trough is concentric with the sprocket 16.

My constant level device includes a pump formed by fins or blades 20 on the faces of the sprocket 16. The sprocket is vertically disposed in the hopper outlet 15 for rotation about a transverse axis 21 and occupies most of the outlet. However, at the forward side of the outlet, beyond the sprocket 16, is a clear throat 15a downwardly through which the material in the hopper 12 will feed by gravity onto the chain 11 moving therebeneath. At the rear side of the outlet 15, the hopper is closed and sealed by means of a flexible seal arrangement 15b so that no material will feed from the hopper at this side of the sprocket.

The fins or blades 20 project outwardly from opposite faces of the sprocket 16. Each fin or blade is of closed elliptical or oval form and projects at right angles to the face of the sprocket. The fin 20 on one face of the sprocket 16 is angularly offset relative to the fin 20 at the opposite side of the sprocket as shown in Figure 1.

The seal arrangement 15b comprises a pair of leaf springs or flat blades 23 which are disposed side-by-side at the hopper outlet and project into contact with the respective fins 20. The springs 23 have their upper ends fastened rigidly by bolts 24 to the lower side of the rear wall of the hopper and project downwardly beyond the edge 25 of the hopper outlet to a point substantially in alignment with axis 21. The lower ends of the springs 23 straddle the sprocket 16 and engage the lower surfaces of the respective fins 20. It will be apparent that as the sprocket 16 is rotated counterclockwise, the lower ends of springs 23 will resiliently wipe against the surfaces of the fins 20 and will flex during rotation of the wheel. Thus, an effective seal will be provided at this side of the hopper outlet. Because the fins 20 are offset angularly, less power will be required to rotate sprocket 16 since the springs 23 will be flexed at different intervals.

With reference to Figure 1, it will be noted that the sprocket 16 will rotate counterclockwise and will move the chain to the right. At the forward edge of hopper outlet 15, a strike-off and leveling blade 26 is provided which has a downwardly extending strike-off edge 27 that is spaced a suitable distance above the bottom of the trough 10. Therefore, the lower edge 27 of the blade will serve to strike-off material, carried by the chain in the trough, at a fixed level. Thus, the level of material on the chain will never exceed the height of the edge 27 above the chain.

In the operation of our device, normally the feed will flow by gravity down through throat 15a from the hopper onto the chain 11 and will be carried to the right through the trough 10. The sprocket 16 will rotate in a counterclockwise direction and the springs 23 will maintain a seal against the fins 22 being flexed at succeeding intervals. Rotation of the sprocket and swinging of the ends of fins 20 along the curved portion 17a of the trough will prevent feed from backing up into such portion and jamming. It sometimes happens that the feed in the trough is not consumed sufficiently fast by the poultry and will be returned by the chain 11 beneath the hopper 12. However, the fins 20 swinging around into the throat will lift or pump excess material back up into the hopper. The strike-off edge 27 strikes-off the feed on the chain to a predetermined level and any excess is pumped back up into the hopper by the fins.

It will be apparent from the above description that I have provided a simple feed supplying and leveling device in association with the distributing chain on an automatic poultry feeder which will serve to supply the feed onto the chain and to prevent the feed from accumulating in an excessive amount on the chain. The device is extremely simple and inexpensive yet very effective.

Many advantages have been discussed and others will be apparent.

Having thus described my invention, what I claim is:

1. In combination with a material distributing member movable beneath a feed hopper having a material outlet, a blade mounted at said outlet, means for rotating said blade, a seal between the blade and the one edge of said outlet and a feed throat between the blade and the opposite edge of the outlet, and leveling means disposed beyond said blade in the direction of movement of said distributing member comprising a strike-off edge that is spaced at the desired level from said distributing member.

2. The combination of claim 1 wherein the distributing member is an endless chain carried by a sprocket, said blade being mounted for rotation with said sprocket co-axially therewith.

3. The combination of claim 2 wherein the blades are disposed on opposite faces of the sprocket and said seal comprises blades carried by the hopper straddling said sprocket and resiliently engaging the first blades.

4. The combination of claim 3 wherein the blades on the sprocket are endless bands projecting from the opposite faces thereof, said seal comprising leaf springs rigidly carried by the hopper and having their free ends straddling the sprocket and engaging the faces of said endless bands.

5. The combination of claim 4 wherein the distributing chain is disposed in a trough which has an inclined section at the lower side of the sprocket which is opposite said strike-off edge.

WM. P. GRAETZ.

REFERENCES CITED

The following references are of record in the file of this patent:

UNITED STATES PATENTS

| Number | Name | Date |
| --- | --- | --- |
| 314,265 | Ruhland | Mar. 24, 1885 |
| 533,252 | Thomas | Jan. 29, 1895 |
| 803,082 | Waterman | Oct. 31, 1905 |
| 2,007,874 | Redler | July 9, 1935 |